United States Patent
Xing

(10) Patent No.: US 10,290,274 B2
(45) Date of Patent: May 14, 2019

(54) ARRAY SUBSTRATE

(71) Applicant: WUHAN CHINA STAR OPTOELECTRONICS TECHNOLOGY CO., LTD., Wuhan (CN)

(72) Inventor: Zhenzhou Xing, Wuhan (CN)

(73) Assignee: WUHAN CHINA STAR OFTOELECTRONICS TECHNOLOGY CO., LTD., Wuhan (CN)

(*) Notice: Subject to any disclaimer, the term of this patent is extended or adjusted under 35 U.S.C. 154(b) by 100 days.

(21) Appl. No.: 15/323,973

(22) PCT Filed: Dec. 1, 2016

(86) PCT No.: PCT/CN2016/108185
§ 371 (c)(1),
(2) Date: Jan. 5, 2017

(87) PCT Pub. No.: WO2018/040340
PCT Pub. Date: Mar. 8, 2018

(65) Prior Publication Data
US 2018/0182336 A1 Jun. 28, 2018

(30) Foreign Application Priority Data
Aug. 31, 2016 (CN) .......................... 2016 1 0783860

(51) Int. Cl.
G09G 3/36 (2006.01)
G02F 1/1362 (2006.01)

(52) U.S. Cl.
CPC ......... *G09G 3/3677* (2013.01); *G09G 3/3688* (2013.01); *G02F 1/136286* (2013.01); *G09G 2310/0297* (2013.01)

(58) Field of Classification Search
CPC combination set(s) only.
See application file for complete search history.

(56) References Cited

U.S. PATENT DOCUMENTS

| 6,266,038 | B1 | 7/2001 | Yoshida et al. | |
|---|---|---|---|---|
| 2005/0117410 | A1 | 6/2005 | Shin | |
| 2008/0055304 | A1 | 3/2008 | Ryu | |
| 2012/0313903 | A1* | 12/2012 | Pyon | G09G 3/32 345/204 |
| 2015/0161930 | A1* | 6/2015 | Kim | G09G 3/20 345/214 |
| 2017/0148404 | A1 | 5/2017 | Xing et al. | |

FOREIGN PATENT DOCUMENTS

| CN | 1658262 A | 8/2005 |
|---|---|---|
| CN | 104849890 A | 8/2015 |
| JP | 3308880 B2 | 7/2002 |

* cited by examiner

Primary Examiner — Robin J Mishler
(74) Attorney, Agent, or Firm — JMB Davis Ben-David

(57) ABSTRACT

An array substrate proposes a gate driver, a data driver, and a driver circuit structure. The driver circuit structure includes a plurality of driver circuit units. Each of driver circuit units includes a pixel matrix, a plurality of second gate lines, a plurality of first data lines, and a plurality of demultiplexers. The conventional technical problem that the data lines and the gate lines increase when screen resolution and image resolution increase, which affects the rate of penetration and the display effect, is successfully solved.

18 Claims, 4 Drawing Sheets

ARRAY SUBSTRATE

CROSS-REFERENCE TO RELATED APPLICATIONS

This is the U.S. National Stage of International Patent Application No. PCT/CN2016/108185, filed Dec. 1, 2016, which in turn claims the benefit of Chinese Patent Application No. 201610783860.6, filed Aug. 31, 2016.

BACKGROUND

1. Field of the Disclosure

The present disclosure relates to the field of liquid crystal display, and more particularly, to an array substrate.

2. Description of the Related Art

Flat display devices, such as liquid crystal displays (LCDs) have advantages of high resolution, low power consumption, thin body, wide applied field, and so on, so they are widely applied to various kinds of consumer electronics products, such as cellphones, televisions, personal digital assistants (PDAs), digital cameras, notebook computers, and desk computers, and become the mainstream display devices. Conventionally, backlight LCDs are the mainstream products, including thin film transistor liquid crystal display (TFT-LCD) panels and backlight modules. The operating principle of a TFT-LCD panel is as follows: Liquid crystal molecules are inserted between two parallel glass substrates. Very small electrical wire is perpendicularly and horizontally arranged between the parallel glass substrates. The alignment of the liquid crystal molecules is changed after being electrified. Afterwards, the light beams produced by the backlight modules are refracted so that images can be generated.

A conventional driver structure of the display circuit is like what FIG. 3 shows. FIG. 3 shows a pixel electrode 4 connected to a data line 2 and a gate line 1 through a thin-film transistor (TFT) 3. A gate on each of the gate lines 1 is well controlled to be turned on, and the data is well input to each of the data lines 2 in the conventional driver structure. The number of the data line 2 and the number of the gate line 1 increase when screen resolution and resolution increase, which affects the rate of penetration and the display effect. To keep screen resolution and the transmissive rate unchanged and to reduce the number of the data line, three data lines share one data line via a demultiplexer, and the three data lines are connected to three different pixels on one row respectively in the conventional technology. However, this structure consumes more energy in a common column reverse display condition. It is urgent to change this condition.

SUMMARY

An object of the present disclosure is to propose an array substrate so that the main problem occurring in the conventional technology can be solved. The problem of the conventional technology is that the data lines and the gate lines increase when screen resolution and image resolution increase, which further affects the rate of penetration and the display effect.

According to another embodiment of the present disclosure, an array substrate, includes a gate driver, a data driver, and a driver circuit structure; the driver circuit structure comprising a plurality of driver circuit units. Each of the plurality of driver circuit units includes:

a pixel matrix, comprising a plurality of pixels, configured to show an image signal;

a plurality of second gate lines, each of the plurality of second gate lines being configured to drive one row of pixels forming the pixel matrix;

a plurality of first data lines, being perpendicular to the plurality of second gate lines; half the plurality of first data lines being arranged on a left-side area of the pixel matrix; the other half of the plurality of first data lines being arranged on a right-side area of the pixel matrix; the plurality of first data lines being configured to input data signals to corresponding pixels;

a plurality of demultiplexers, configured to share data signal applied on each of the plurality of first data lines with a plurality of second data lines, and configured to control the plurality of second data lines to turn on and turn off;

wherein a plurality of first gate lines are arranged on the gate driver; data signal applied on each of the plurality of first gate lines is shared with a plurality of second gate lines; the plurality of second gate lines drives each row of pixels forming the pixel matrix one on one correspondingly; the plurality of first data lines are arranged on the data driver; data signal applied on each of the plurality of first data lines is shared with the plurality of second data lines via the plurality of demultiplexers; each of the plurality of demultiplexers outputs the plurality of second data lines and is connected to half the pixels on each row correspondingly; the pixels on each row are correspondingly connected to the plurality of second data lines, which are output by two of the plurality of demultiplexers; the two of the plurality of demultiplexers correspond to the first data lines differently;

data signal applied on each of the plurality of first gate lines being shared with two of the plurality of second gate lines; data signal applied on the plurality of first data lines shared with six of the plurality of second data lines via each of the plurality of demultiplexers.

Optionally, four of the plurality of first data lines are arranged the data driver, and two of the plurality of first data lines are arranged on the right-side area and the left-side area of the driver circuit unit respectively for one of the driver circuit unit.

Optionally, two of the plurality of demultiplexers which the plurality of second data lines connected to the pixel on each row one on one correspond to are arranged on one of the plurality of first data line on the right-side area and left-side area of the driver circuit unit, respectively.

Optionally, different or identical grayscale signals are input to the corresponding pixels independently through each of the plurality of second data lines output by each of the plurality of demultiplexers.

Optionally, in one of the plurality of driver circuit units, the plurality of second data lines output by one of the plurality of demultiplexers are correspondingly connected to one of the plurality of pixels, and each of the plurality of pixels is not adjacent to each other.

Optionally, two of the plurality of second gate lines from the same first gate line drive any two adjoining rows of pixels in the pixel matrix, respectively.

Optionally, two of the plurality of second gate lines from the same first gate line drive any two nonadjoining rows of pixels in the pixel matrix, respectively.

Optionally, twelve pixels are arranged on each row of the pixels forming the pixel matrix in one of the plurality of driver circuit units; the pixel matrix comprising red, green, and blue (RGB) pixels or red, green, blue, and white (RGBW) pixels.

According to another embodiment of the present disclosure, an array substrate, includes a gate driver, a data driver, and a driver circuit structure; the driver circuit structure comprising a plurality of driver circuit units. Each of the plurality of driver circuit units includes:

a pixel matrix, including a plurality of pixels, configured to show an image signal;

a plurality of second gate lines, each of the plurality of second gate lines being configured to drive one row of pixels forming the pixel matrix;

a plurality of first data lines, being perpendicular to the plurality of second gate lines; half the plurality of first data lines being arranged on a left-side area of the pixel matrix; the other half of the plurality of first data lines being arranged on a right-side area of the pixel matrix; the plurality of first data lines being configured to input data signals to corresponding pixels;

a plurality of demultiplexers, configured to share data signal applied on each of the plurality of first data lines with a plurality of second data lines, and configured to control the plurality of second data lines to turn on and turn off;

wherein a plurality of first gate lines are arranged on the gate driver; data signal applied on each of the plurality of first gate lines is shared with a plurality of second gate lines; the plurality of second gate lines drives each row of pixels forming the pixel matrix one on one correspondingly; the plurality of first data lines are arranged on the data driver; data signal applied on each of the plurality of first data lines is shared with the plurality of second data lines via the plurality of demultiplexers; each of the plurality of demultiplexers outputs the plurality of second data lines and is connected to half the pixels on each row correspondingly; the pixels on each row are correspondingly connected to the plurality of second data lines, which are output by two of the plurality of demultiplexers; the two of the plurality of demultiplexers correspond to the first data lines differently.

Optionally, data signal applied on each of the plurality of first gate lines is shared with two of the plurality of second gate lines.

Optionally, data signal applied on the plurality of first data lines is shared with six of the plurality of second data lines via each of the plurality of demultiplexers.

Optionally, four of the plurality of first data lines are arranged the data driver, and two of the plurality of first data lines are arranged on the right-side area and the left-side area of the driver circuit unit respectively for one of the driver circuit unit.

Optionally, two of the plurality of demultiplexers which the plurality of second data lines connected to the pixel on each row one on one correspond to are arranged on one of the plurality of first data line on the right-side area and left-side area of the driver circuit unit, respectively.

Optionally, different or identical grayscale signals are input to the corresponding pixels independently through each of the plurality of second data lines output by each of the plurality of demultiplexers.

Optionally, in one of the plurality of driver circuit units, the plurality of second data lines output by one of the plurality of demultiplexers are correspondingly connected to one of the plurality of pixels, and each of the plurality of pixels is not adjacent to each other.

Optionally, two of the plurality of second gate lines from the same first gate line drive any two adjoining rows of pixels in the pixel matrix, respectively.

Optionally, two of the plurality of second gate lines from the same first gate line drive any two nonadjoining rows of pixels in the pixel matrix, respectively.

Optionally, twelve pixels are arranged on each row of the pixels forming the pixel matrix in one of the plurality of driver circuit units; the pixel matrix comprising red, green, and blue (RGB) pixels or red, green, blue, and white (RGBW) pixels.

The present disclosure has benefits as follows:

Data applied on the first data line is shared by a plurality of second data lines via the demultiplexer on the array substrate used in the present disclosure. The plurality of second data lines are correspondingly connected to the pixel on one row one on one. The conventional technical problem that the data lines and the gate lines increase when screen resolution and image resolution increase, which affects the rate of penetration and the display effect, is successfully solved.

DETAILED DESCRIPTION OF THE EMBODIMENTS

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures.

Embodiment 1

Figure 1:
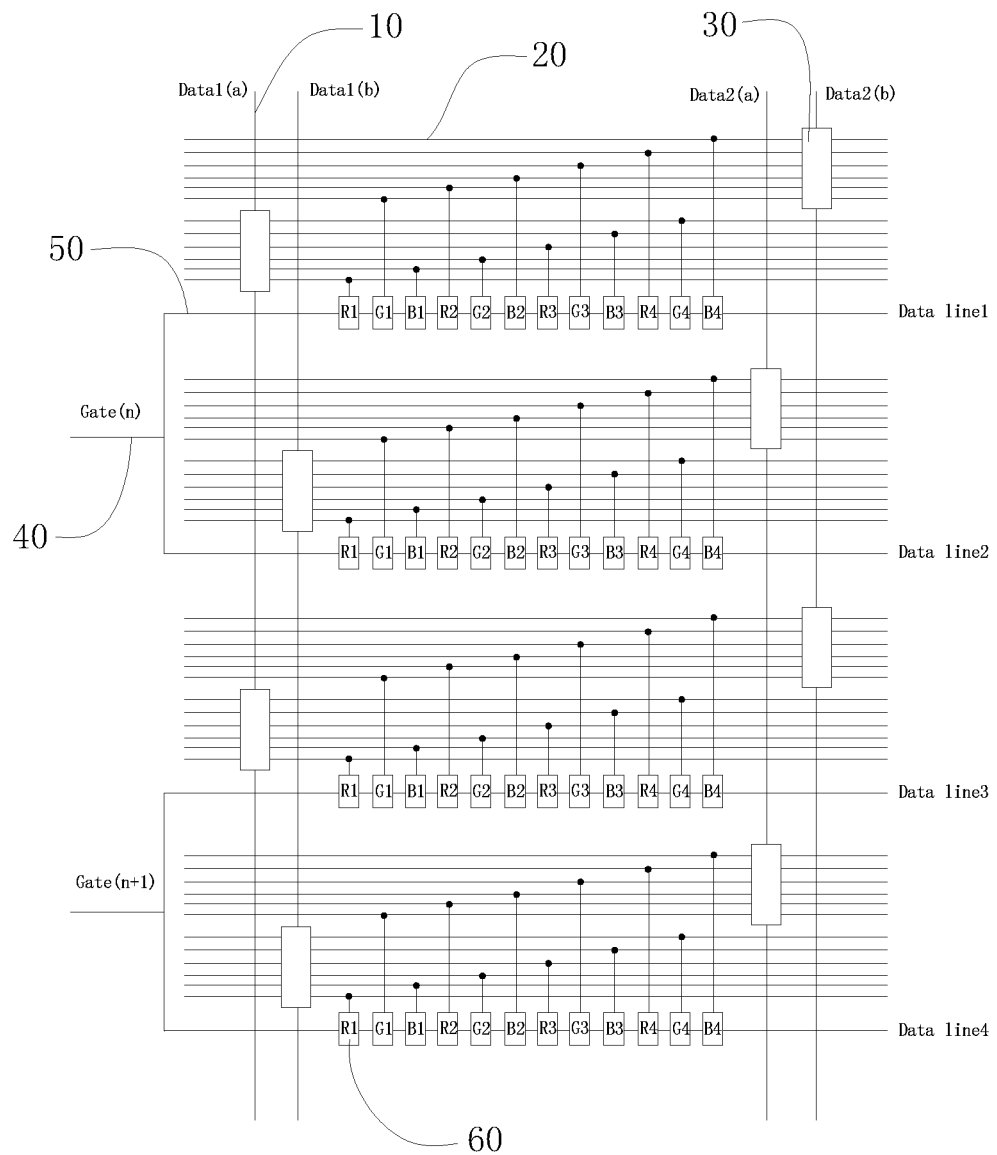
FIG. 1 is a schematic diagram of a driver circuit unit of an array substrate according to one embodiment of the present disclosure.

Please refer to FIG. 1. FIG. 1 is a schematic diagram of a driver circuit unit of an array substrate according to one embodiment of the present disclosure. The array substrate includes a gate driver, a data driver, and a driver circuit structure. The driver circuit structure includes a plurality of driver circuit units. Each of the plurality of driver circuit units includes a pixel matrix, a plurality of second gate lines 50, a plurality of first data lines 10, and a plurality of first data lines demultiplexers 30.

The pixel matrix includes a plurality of pixels 60 and is used to show an image signal.

Each of the plurality of second gate lines 50 is used to drive a row of pixels 60 forming the pixel matrix.

The plurality of first data lines 10 are perpendicular to the plurality of second gate lines 50. Half the plurality of first data lines 10 are arranged on the left-side area of the pixel matrix, and the other half are arranged on the right-side area of the pixel matrix. The plurality of first data lines 10 are used to input a data signal to their corresponding the pixels 60.

The plurality of demultiplexers 30 are used to share data signal applied on each of the plurality of first data lines 10 with a plurality of second data lines 20. Further, the plurality of demultiplexers 30 are used to turn on and turn off the plurality of second data lines 20.

A plurality of first gate lines 40 are arranged on the gate driver. Data signal applied on each of the plurality of first gate lines 40 is shared with a plurality of second gate lines 50. The plurality of second gate lines 50 drives each row of pixels 60 forming the pixel matrix correspondingly. A plurality of first data lines 10 are arranged on the data driver. Data signal applied on each of the plurality of first data lines 10 is shared with a plurality of second data lines 20 via the plurality of demultiplexer 30. Each of the plurality of demultiplexers 30 outputs a plurality of second data lines 20 and is connected to half the pixels 60 on each row correspondingly. The pixels 60 on each row are correspondingly connected to the plurality of second data lines 20, which are output by two of the plurality of demultiplexers 30. The two of the plurality of demultiplexers 30 correspond to the first data lines 10 differently.

Preferably, data signal applied on each of the plurality of first gate lines 40 is shared with two second gate lines 50.

Preferably, data signal applied on each of the plurality of first data lines 10 is shared with six second data lines 20 via each of the plurality of demultiplexers 30.

In one of the plurality of driver circuit units, the data driver corresponds to four of the plurality of first data lines 10. Two of the plurality of first data lines 10 are arranged in the left-side area of the driver circuit unit. Likewise, and two of the plurality of first data lines 10 are arranged in the right-side area of the driver circuit unit.

Each of the plurality of second data lines 20 is correspondingly connected to each row of the plurality of pixels 60 one on one. The plurality of second data lines 20 correspond to two of the plurality of demultiplexers 30. Each of the demultiplexers 30 are arranged on one of the plurality of first data lines 10 arranged in the right-side and left-side areas of the driver circuit unit. Such an arrangement makes the circuit structure more balanced and reasonable.

Different or identical grayscale signals are input to the corresponding pixels 60 independently through each of the plurality of second data lines 20 output by each of the plurality of demultiplexers 30. So the signals output via each of the outputs are independently controlled by the plurality of demultiplexers 30. Different grayscale signals are output for display according to practical conditions.

In one of the plurality of driver circuit units, the plurality of second data lines 20 output by one of the plurality of demultiplexers 30 are correspondingly connected to one row of the pixels 60. Each of the pixels 60 is not adjacent to each other.

The two second gate lines 50 from the same first gate line 40 drive any two adjoining rows of pixels 60 in the pixel matrix, respectively.

Figure 2:
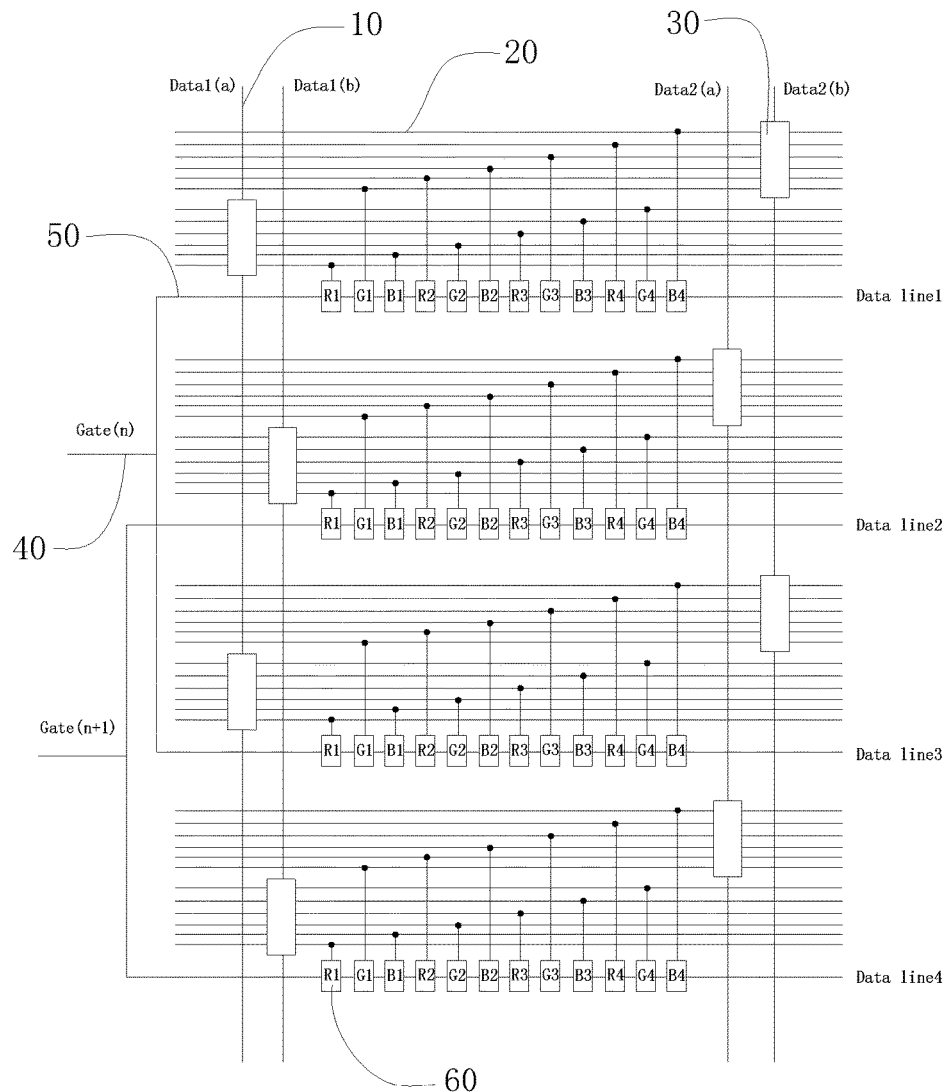
FIG. 2 is a schematic diagram of a driver circuit unit of an array substrate according to another embodiment of the present disclosure.
Figure 3:
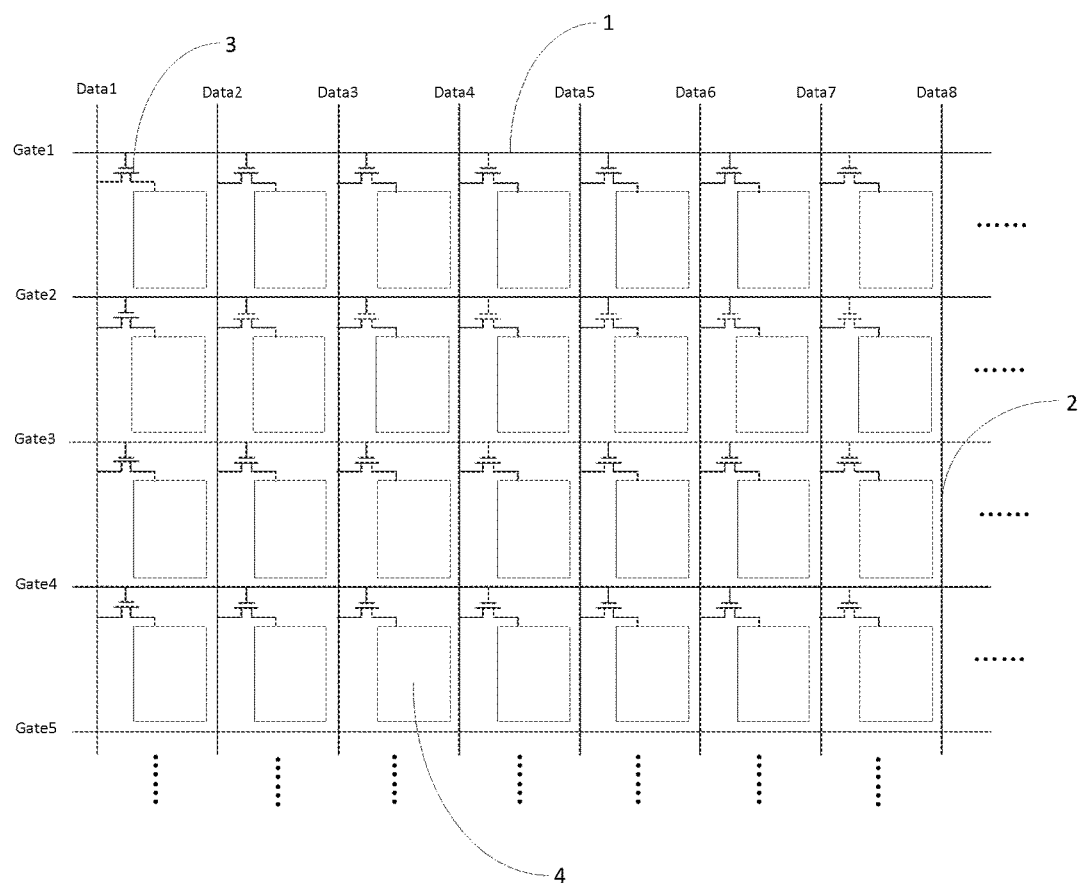
FIG. 3 is a schematic diagram of a conventional driver circuit unit of an array substrate.

The two second gate lines 50 from the same first gate line 40 drive any two nonadjoining rows of pixels 60 forming the pixel matrix, respectively. Please refer to FIG. 2 showing a schematic diagram of a driver circuit unit on an array substrate in another embodiment of the present disclosure. Like the first data line 10 shown in FIG. 1, data signal applied on the first data line 10 shown in FIG. 2 is shared with a plurality of second data lines 20 by the plurality of demultiplexers 30 and connected to each row of pixels 60 according to the same method. Unlike FIG. 1, in FIG. 2 data signal applied on the same first gate line 40 is shared with a plurality of second gate lines 50, and the plurality of second gate lines 50 are connected to nonadjoining rows of the pixels 60.

In one of the plurality of driver circuit units, 12 pixels are arranged on each row of the pixels 60 forming the pixel matrix. The pixel matrix includes red, green, and blue (RGB) pixels 60 or red, green, blue, and white (RGBW) pixels 60. (The schematic diagram showing the RGBW pixel matrix is not shown.) If the pixel matrix is a RGB pixel matrix, one row of the pixel 60 in the driver circuit unit includes four pixel units, and each of the pixel units includes three pixels 60 (RGB). If the pixel matrix is a RGBW pixel matrix, one row of the pixel 60 in the driver circuit unit includes three pixel units, and each of the pixel units includes four pixels 60 (RGBW).

Figure 4:
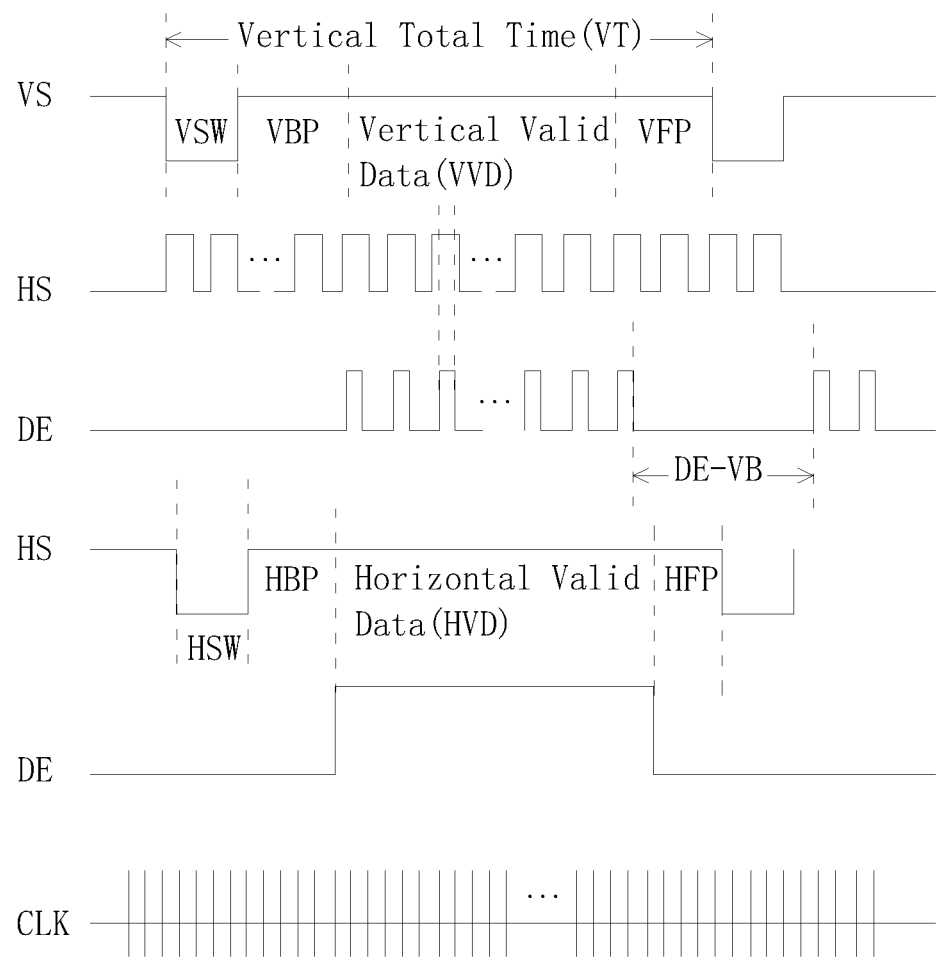
FIG. 4 shows a timing diagram of the driver circuit unit of the array substrate according to the present disclosure.

Please refer to FIG. 4 showing a timing diagram of the driver circuit unit of the array substrate according to the present disclosure. VSYN is a V sync signal and a frame synchronicity signal. HSYN is an H sync signal and a row synchronicity signal. VBP is a back porch of V sync and used to transmit some audible signals and so on. (An audible signal in a frame of time is transmitted via VACT.) VFP is a front porch of V sync and a blank time slot for preparing for the transmitted data in the next frame. VS is a low level pulse of V sync. VACT is a valid width of V sync. HBP is a back porch of V sync and used to transmit some audible signals and so on. (An audible signal in a row of time is transmitted via HACT.) HFP is a front porch of V sync and a blank time slot for preparing for the transmitted data in the next frame. HS is a low level pulse of H sync. HACT is a valid width of H sync. DEN is a pro-validity signal. CLK is a clock signal.

The workflow of the present disclosure is follows:

Each of FIG. 1 and FIG. 2 shows one kind of circuit structures of the 2to12 De-mux driver structure. Each of the plurality of first gate lines 40 control two of the plurality of second gate lines 50 to turn on and off at the same time. When the one of the first gate lines 40 (such as Gate n shown in the figure) is turned on, two of the second gate lines 50 (such as Gate line1 and Gate line2 shown in the figure) are turned on, and four of the first data lines 10 (such as Data1(a), Data1(b), Data2(a), and Data2(b) shown in the figure) supply power to the pixel 60 on two of the second gate lines 50 (such as Gate line1 and Gate line2 shown in the figure) through twelve of the second data lines 20. When another one of the first gate lines 40 (such as Gate(n+1) shown in the figure) is turned on, another two of the second gate lines 50 (such as Gate line3 and Gate line4 shown in the figure) are turned on, and four of the first data lines 10 (such as Data1(a), Data1(b), Data2(a), and Data2(b) shown in the figure) supply power to the pixel 60 on the second gate lines 50 (such as Gate line3 and Gate line4 shown in the figure) through twelve of the second data lines 20. Whenever the pixel 60 is charged, each of the second data lines 20 controls to charge the pixel 60 connected to each of the second data lines 20 independently rather than to charge the relevant pixels 60 at the same time. In other words, some of the pixels 60 are charged and the others are not. Compared with the conventional 2to6 De-mux driver structure, the number of the gate line is reduced to half its original number in the 2to12 De-mux driver structure adopted by the present disclosure. It is beneficial to realize a barrow bezel. In addition, the number of the data line used by the 2to12 De-mux driver structure remains the same as the number of the data line used by the 2to6 De-mux driver structure.

In the conventional technology, data signal applied on one data line is shared with three data lines via the demultiplexers 30, and the three data lines are connected to three of the different pixels 60 on the same row. The driver structure includes 1,080 data lines and 1,920 gate lines. One frame of the charging display time is 16.7 ms. One frame of the charging time of each of the gate lines is (16.7/1920) ms. In this way, the charging time of each of the pixels 60 is about (16.7/1920)/(1080*3) ms. However, one frame of the charging display time is about 16.7 ms, and one frame of the charging time of each of the gate lines is 16.7/(1920/2) ms in the present disclosure. In this way, the charging time of each of the pixels 60 is about 16.7/(1920/2)/(1080*3) ms. In other words, the charging time of each of the pixels 60 increases. The increase in the charging time guarantees time for the present disclosure and makes the present disclosure come true.

Data signal applied on the first data line 10 is shared with a plurality of second data lines 20 via the demultiplexer 30 in the present array substrate. The plurality of second data lines 20 are correspondingly connected to a row of pixels 60 one on one so that the problem of the conventional technology can be solved. In the conventional technology, the data lines and the gate lines increase when screen resolution and image resolution increase, which affects the rate of penetration and the display effect. Moreover, the power consumption of the LCD panel is reduced with the 2to12 De-mux driver structure (i.e. a 2to12 demultiplexer, and specifically, a data line being connected to six of the nonadjoining pixels 60) with an in cell touch panel (i.e. a substrate of a touch panel arranged in a liquid crystal panel) in the present disclosure. So the charging time is guaranteed. The 1 to 6 De-mux (i.e. a 1 to 6 demultiplexer, and specifically, a data line being connected to six of the adjoining pixels 60) with the in cell touch panel is truly realizable. Also, the LCD panel with a narrow bezel is exactly possible. If the drive plan of the 1 to 6 De-mux with the RGBW is adopted, not only the charging rate of the pixel 60 is enhanced but also the narrow bezel is realized.

Although the present invention has been explained by the embodiments shown in the drawings described above, it should be understood to the ordinary skilled person in the art that the invention is not limited to the embodiments, but rather various changes or modifications thereof are possible without departing from the spirit of the invention. Accordingly, the scope of the invention shall be determined only by the appended claims and their equivalents.

What is claimed is:

1. An array substrate, comprising a gate driver, a data driver, and a driver circuit structure; the driver circuit structure comprising a plurality of driver circuit units; each of the plurality of driver circuit units comprising:
    a pixel matrix, comprising a plurality of pixels, configured to show an image signal;
    a plurality of second gate lines, each of the plurality of second gate lines being configured to drive one row of pixels forming the pixel matrix;
    a plurality of first data lines, being perpendicular to the plurality of second gate lines; half the plurality of first data lines being arranged on a left-side area of the pixel matrix; the other half of the plurality of first data lines being arranged on a right-side area of the pixel matrix; the plurality of first data lines being configured to input data signals to corresponding pixels;
    a plurality of demultiplexers, configured to share data signal applied on each of the plurality of first data lines with a plurality of second data lines, and configured to control the plurality of second data lines to turn on and turn off;

wherein a plurality of first gate lines are arranged on the gate driver; data signal applied on each of the plurality of first gate lines is shared with a plurality of second gate lines; the plurality of second gate lines drives each row of pixels forming the pixel matrix one on one correspondingly; the plurality of first data lines are arranged on the data driver; data signal applied on each of the plurality of first data lines is shared with the plurality of second data lines via the plurality of demultiplexers; each of the plurality of demultiplexers outputs the plurality of second data lines and is connected to half the pixels on each row correspondingly wherein one of the plurality of demultiplexer is connected to even pixels on a specific row and another one of the plurality of demultiplexer is connected to odd pixels on the specific row; the pixels on each row are correspondingly connected to the plurality of second data lines, which are output by two of the plurality of demultiplexers; the two of the plurality of demultiplexers correspond to the first data lines differently;
    data signal applied on each of the plurality of first gate lines being shared with two of the plurality of second gate lines; data signal applied on the plurality of first data lines shared with six of the plurality of second data lines via each of the plurality of demultiplexers.

2. The array substrate of claim 1, wherein four of the plurality of first data lines are arranged on the data driver, and two of the plurality of first data lines are arranged on the right-side area and the left-side area of the driver circuit unit respectively for one of the driver circuit unit.

3. The array substrate of claim 1, wherein two of the plurality of demultiplexers which the plurality of second data lines connected to the pixel on each row one on one correspond to are arranged on one of the plurality of first data line on the right-side area and left-side area of the driver circuit unit, respectively.

4. The array substrate of claim 1, wherein different or identical grayscale signals are input to the corresponding pixels independently through each of the plurality of second data lines output by each of the plurality of demultiplexers.

5. The array substrate of claim 1, wherein in one of the plurality of driver circuit units, the plurality of second data lines output by one of the plurality of demultiplexers are correspondingly connected to one of the plurality of pixels, and each of the plurality of pixels is not adjacent to each other.

6. The array substrate of claim 1, wherein two of the plurality of second gate lines from the same first gate line drive any two adjoining rows of pixels in the pixel matrix, respectively.

7. The array substrate of claim 1, wherein two of the plurality of second gate lines from the same first gate line drive any two nonadjoining rows of pixels in the pixel matrix, respectively.

8. The array substrate of claim 1, wherein twelve pixels are arranged on each row of the pixels forming the pixel matrix in one of the plurality of driver circuit units; the pixel matrix comprising red, green, and blue (RGB) pixels or red, green, blue, and white (RGBW) pixels.

9. An array substrate, comprising a gate driver, a data driver, and a driver circuit structure; the driver circuit structure comprising a plurality of driver circuit units; each of the plurality of driver circuit units comprising:
    a pixel matrix, comprising a plurality of pixels, configured to show an image signal;

a plurality of second gate lines, each of the plurality of second gate lines being configured to drive one row of pixels forming the pixel matrix;

a plurality of first data lines, being perpendicular to the plurality of second gate lines; half the plurality of first data lines being arranged on a left-side area of the pixel matrix; the other half of the plurality of first data lines being arranged on a right-side area of the pixel matrix; the plurality of first data lines being configured to input data signals to corresponding pixels;

a plurality of demultiplexers, configured to share data signal applied on each of the plurality of first data lines with a plurality of second data lines, and configured to control the plurality of second data lines to turn on and turn off;

wherein a plurality of first gate lines are arranged on the gate driver; data signal applied on each of the plurality of first gate lines is shared with a plurality of second gate lines; the plurality of second gate lines drives each row of pixels forming the pixel matrix one on one correspondingly; the plurality of first data lines are arranged on the data driver; data signal applied on each of the plurality of first data lines is shared with the plurality of second data lines via the plurality of demultiplexers; each of the plurality of demultiplexers outputs the plurality of second data lines and is connected to half the pixels on each row correspondingly wherein one of the plurality of demultiplexer is connected to even pixels on a specific row and another one of the plurality of demultiplexer is connected to odd pixels on the specific row; the pixels on each row are correspondingly connected to the plurality of second data lines, which are output by two of the plurality of demultiplexers; the two of the plurality of demultiplexers correspond to the first data lines differently.

10. The array substrate of claim 9, wherein data signal applied on each of the plurality of first gate lines is shared with two of the plurality of second gate lines.

11. The array substrate of claim 9, wherein data signal applied on the plurality of first data lines is shared with six of the plurality of second data lines via each of the plurality of demultiplexers.

12. The array substrate of claim 9, wherein four of the plurality of first data lines are arranged on the data driver, and two of the plurality of first data lines are arranged on the right-side area and the left-side area of the driver circuit unit respectively for one of the driver circuit unit.

13. The array substrate of claim 9, wherein two of the plurality of demultiplexers which the plurality of second data lines connected to the pixel on each row one on one correspond to are arranged on one of the plurality of first data line on the right-side area and left-side area of the driver circuit unit, respectively.

14. The array substrate of claim 9, wherein different or identical grayscale signals are input to the corresponding pixels independently through each of the plurality of second data lines output by each of the plurality of demultiplexers.

15. The array substrate of claim 9, wherein in one of the plurality of driver circuit units, the plurality of second data lines output by one of the plurality of demultiplexers are correspondingly connected to one of the plurality of pixels, and each of the plurality of pixels is not adjacent to each other.

16. The array substrate of claim 9, wherein two of the plurality of second gate lines from the same first gate line drive any two adjoining rows of pixels in the pixel matrix, respectively.

17. The array substrate of claim 9, wherein two of the plurality of second gate lines from the same first gate line drive any two nonadjoining rows of pixels in the pixel matrix, respectively.

18. The array substrate of claim 9, wherein twelve pixels are arranged on each row of the pixels forming the pixel matrix in one of the plurality of driver circuit units; the pixel matrix comprising red, green, and blue (RGB) pixels or red, green, blue, and white (RGBW) pixels.

* * * * *